(No Model.) 2 Sheets—Sheet 1.
A. M. FREEMAN & J. B. OVERMEYER.
SUSPENDERS.
No. 325,740. Patented Sept. 8, 1885.
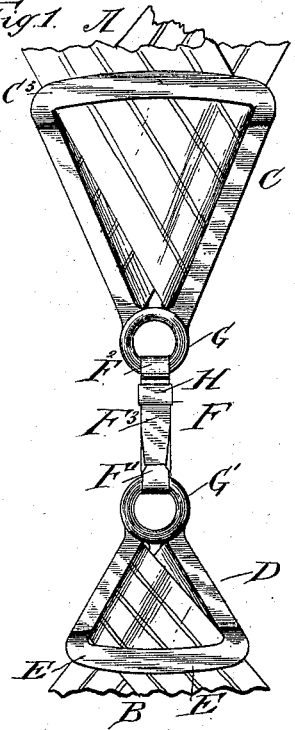
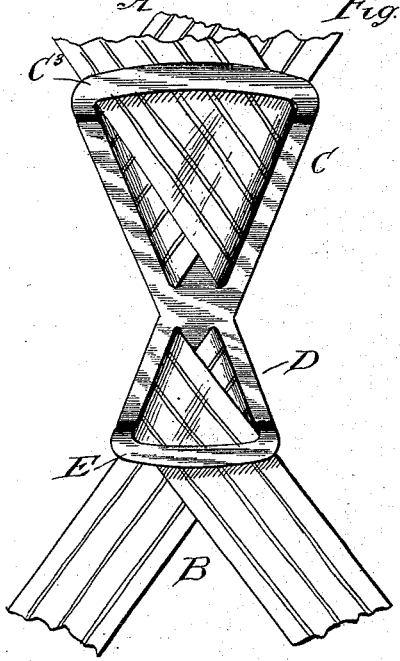
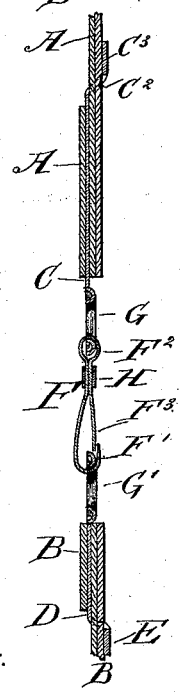
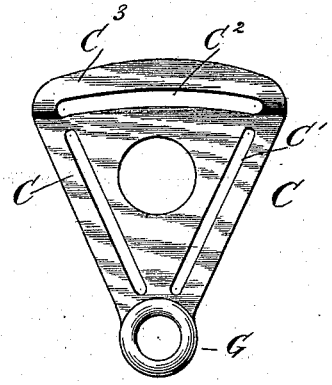
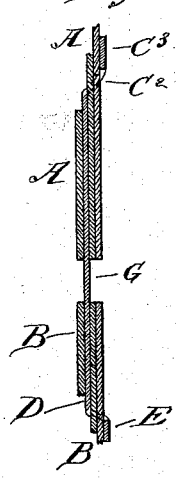
Witnesses.
W. Rossiter.
W. W. Elliott
Inventor.
Alva M. Freeman and
John B. Overmeyer
By Jno. G. Elliott
Atty.

(No Model.) 2 Sheets—Sheet 2.
A. M. FREEMAN & J. B. OVERMEYER.
SUSPENDERS.
No. 325,740. Patented Sept. 8, 1885.
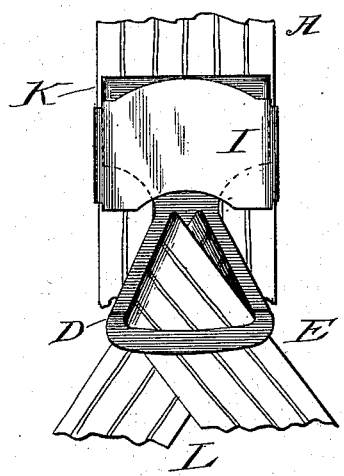
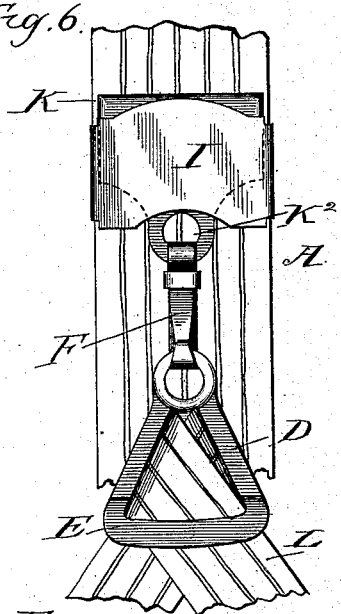
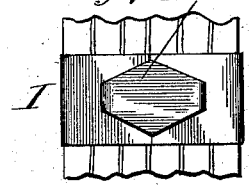
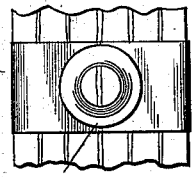
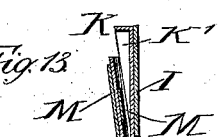
Witnesses
W. Rossiter
W. W. Elliott
Inventor
Alva M. Freeman and
John B. Overmeyer
By Jno. G. Elliott
Atty.

UNITED STATES PATENT OFFICE.

ALVA M. FREEMAN AND JOHN B. OVERMEYER, OF CHICAGO, ILLINOIS.

SUSPENDERS.

SPECIFICATION forming part of Letters Patent No. 325,740, dated September 8, 1885.

Application filed March 24, 1884. (No model.)

*To all whom it may concern:*

Be it known that we, ALVA M. FREEMAN and JOHN B. OVERMEYER, both citizens of the United States, and residing in Chicago, county of Cook, and State of Illinois, have invented certain new and useful Improvements in Suspenders, of which the following is a specification.

This invention, while involving improvements in a large variety of suspenders, is especially applicable as an improvement in the suspenders illustrated in Letters Patent of the United States No. 287,818 and No. 287,819, granted to one of the present applicants.

Heretofore, in devices for connecting together the shoulder and pantaloon straps of a suspender, a strap-passage has been provided by a slot formed through a flat unbent plate, in which case the strap passing through the slot is bent out of line, and in other instances the strap-passage has been formed under a loop constructed by making a pair of parallel slits through the plate and bending outwardly the metal between said pair of slits, so that the tension on the strap passing under the loop will be in a right line through the strap.

One object of our invention is to provide the plate with a construction of loop, by means of which, while the feature of the tension exerted in a right line through the strap passing under the loop shall be preserved, the feature of slitting the plate and bending out a narrow strip between a pair of parallel slits shall be avoided, for reasons hereinafter set forth. A further object is to provide a more efficient construction of front attachment in suspenders, in which a clasp is fitted on the front end portion of the web or shoulder-strap and the front pantaloon-strap, suspended from a plate adapted to be wedged in between the clasp and the shoulder-strap passing through the latter, and to provide in a front attachment of such general character a wedge-shaped binding-plate having plain front and rear bearing-faces converging to the lower end of the plate, so as to increase the efficiency of the binding action of the plate under tension; also, to strengthen the construction of the sleeve by forming the same from a metal plate or strip bent into shape, and having its meeting ends secured together by a fastening which admits of the use of solder being altogether dispensed with, so that a more durable fastening at the joint on the sleeve shall be provided; also, to improve the construction of the front attachment for the strap in certain minor details, as hereinafter described and claimed, and illustrated in the annexed drawings, in which—

Figure 1 is a face view of the back attachment for a suspender, with the web and strap broken away beyond the points where they are crossed upon the attachment. Fig. 2 represents a longitudinal central section taken through the attachment shown in Fig. 1. Fig. 3 is a face view of the upper part or section of said attachment. Fig. 4 is a face view of an attachment, and illustrates some of the features shown in Fig. 1 applied to a back attachment made in one piece. Fig. 5 is a central longitudinal section through the attachment shown in Fig. 4. Fig. 6 represents a front view of the front attachment for the front pantaloon-straps of the suspender, portions of the web and strap or suspender-end being broken away. Figs. 7 and 8 are views illustrating means for fastening together the ends of the plate forming the sleeve portion of the front attachment. Fig. 9 represents a section taken on a central horizontal plane through Fig. 7. Fig. 10 shows a like section taken through Fig. 8. Fig. 11 is a vertical central section taken through the sleeve and binding-plate shown in Fig. 6. Fig. 12 is a face view of an attachment showing the principal feature involved in Fig. 6 applied to an attachment in which the upper and lower portions of the binding-plate are made in one piece. Fig. 13 is a central vertical section taken through the attachment illustrated in Fig. 12.

Referring by letter to the several figures of the drawings, in which like letters denote like parts, A indicates the web or body portion of the suspender, which is designed to pass over the shoulders of the wearer. The attachment provided at the back of the suspender for connecting the web with the back straps, B, has, in common with an attachment for a like purpose, (shown in Patent No. 287,818,) the feature of a substantially triangular plate, C, provided with a pair of upwardly-diverging side slots, C', through which the web is drawn, so that when the attachment is in place on the web, at a point intermediate of the ends of the latter, the web can be brought to embrace the middle portion of the plate between the slots by crossing the web upon itself on the face of said slotted plate. In said patent, however, the web which thus crosses itself at the front of the plate passes under a transversely-arranged strap or loop formed by making a pair of parallel slits through the plate at a point between the upper ends of the side slots and the top edge of the plate, and bending outwardly from the face of the plate the metal lying between the said slits. In the present instance I form transversely through the upper portion of the plate at a point above the slots a curved slot, $C^2$, through which the crossing portions of the web pass. In this way the web passes under the top edge portion of the plate, which latter constitutes the loop $C^3$, and as a means whereby the tension upon the web above the side slots shall be in right lines, the plate is struck up so as to bend its upper slotted end portion outwardly from the plane of the plate, thus leaving a suitable passage for the web and causing the upper edge portion of the plate to stand out from the plane of the latter, thereby forming a stronger loop than before. It will be seen that the plate thus formed is provided near one end with a transversely-arranged slot, and that the slotted end portion of the plate is bent out from the face of the plate to form a loop; also, that a passage is thus formed between the loop and the body of the plate, and at a point between two planes parallel with each other, and respectively occupied by the loop and the body of the plate. This back attachment, which is thus connected at its upper end with the web of the suspender, is at its lower end adapted to connect with the rear pantaloon-straps, and for such purpose it is provided at its lower end with a plate, D, preferably of a triangular configuration, and formed with side and end slots in substantially the same way as the upper end or plate, C, of the attachment. The strap-suspending plate or portion D of the attachment is in a reversed position with relation to the upper plate—that is to say, its side slots diverge downwardly, and its transverse slot, through which the crossed portions of the strap passes, lies between the lower ends of the side slots and the lower end of the plate. The lower slotted end of this plate is also bent outwardly to form a loop, E, in the same way and for the same purpose as in the upper plate, and the strap passes through said slots and under the loop, and is crossed upon the face of the plate in a manner similar to that in which the web of the suspender is disposed. A desirable connection between these two slotted end portions or plates, C and D, of the back attachment is attained by means of a snap-link, F, connected at its ends with circular eyes G and G', respectively, formed at the opposing ends of the two plates, in which way a simple and flexible connection is formed between the two ends of the attachment, and thereby the plates prevented from cutting or wearing the web and strap by reason of the chafing to which the web and strap will necessarily be subjected while the suspender is in use. The eyes at the ends of the plates can be provided with rounded edges by means of eyelets clamped upon the plates; or these rounded edges can be formed by simply striking up the plates in any suitable way.

The snap-link consists simply of a strip of metal bent at one end to form a hook, F', and for a portion of its length bent over upon itself to form an end eye, $F^2$, and a spring-tongue, $F^3$, extending from said eye at one end of the device up to the hook at the opposite end thereof. The eye at one end of the snap-link is held closed, and the efficiency of the spring-tongue is increased by means of a band or strap, H, passing around the tongue and back of the snap-link at a point near the eye, which said strap can be prevented from slipping forward by means of a seat or shoulder formed in or upon the tongue or back, or both, of the snap-link.

It will be obvious that the feature of a loop, $C^3$ or E, formed at either or both ends of the attachment, regarding the latter as an entirety, could be employed in other constructions of back attachments than that shown in Figs. 1 and 2; and to such end I have in Figs. 4 and 5 illustrated an attachment made in one piece, and provided at each end with a loop formed by bending out the transversely-slotted end portion of the suspender, as in the preceding figures. It will be seen that the end of the plate can be bent opposite the ends of the slot $C^2$, and that in such way a stronger loop is formed than where the metal has to be bent out from between two parallel slits, in which latter case the loop is weakened at its junction with the plate; also, a more symmetrical and ornamental effect is produced than heretofore, since the top of the plate is exposed, as will be readily understood and appreciated by the manufacturer.

It will be observed that in the patent heretofore referred to the upper plate of the back attachment is provided at its lower end with a hook, upon which a ring engaging with a lower plate for the strap is caught, and that in order to cover up the end of said hook the latter is made long enough to extend under the crossing portions of the web; but by forming the plate C with an eye at its lower end, as in the present instance, the objectionable features of the hook are avoided, and by forming the lower plate with an eye the two plates can be readily and detachably connected together by means of a snap-link.

The suspender attachments for the front pantaloon-straps or "suspender-ends," as they are frequently called, have, in common with the attachment shown in Patent No. 287,819, the features of a sleeve arranged to slide upon the web, and a practically wedge-shaped binding-plate adapted to be forced in between the web and the said sleeve, in order to maintain the latter in its adjustment upon the web, so as to shorten or lengthen the suspender. In the present instance, however, the strap is suspended from the binding-plate, instead of from the sleeve, as in said patent, and the binding-plate is wedged in the sleeve by reason of a downward tension exerted on the binding-plate, instead of by pushing up the wedge-shaped binding-plate, for which latter purpose the binding-plate, as set forth in said patent, was provided with a stud projecting through a slot in the sleeve. Under the present simplified construction the slot and stud can be dispensed with, and the binding-plate can be arranged to enter the sleeve or socket at the top end of the latter, whereby a pull on the strap suspended from the plate at a point below the sleeve will draw and wedge the binding-plate in the sleeve. This feature also enables us to dispense with the teeth with which the binding-plate has heretofore been provided, and which, catching in the web, have interfered with the ready manipulation of the attachment; also, under the present arrangement, when the suspender is in use, the constant tension exerted on the binding plate, through the medium of the strap suspended from the binding-plate and attached at its ends to the pantaloons, will tend to keep the binding-plate firmly wedged in the sleeve, and thus prevent the latter from slipping on the web.

Referring now to the figures of the drawings, (shown on Sheet 2 thereof,) I indicates the flattened sleeve arranged to slide upon the web A. The wedge binding-plate K is made from a metal sheet or plate struck up with two opposing sides, K', having their edges inclined with relation to the body of the plate, so as to render the same capable of subserving the function of a wedge having plane front and rear bearing-faces converging toward the lower end of the plate. As shown in Figs. 6 and 11, this binding-plate is provided at its lower end with an eye, K², from which one of the strap-plates D, heretofore described in connection with the back attachment, is suspended by means of one of the snap-links F, also described in connection with said back attachment of the suspender. In this way the same construction of snap-link and lower slotted plate can be provided for both the front and rear pantaloon-straps, and hence said lower plates be connected by a flexible and swinging connection with the upper devices, which are supported upon the web or body of the suspender.

In Fig. 12 we have shown the binding-plate rigid with or made in one piece with one of the lower strap-suspending plates, D, under which construction, however, it will be seen that the feature of the loop E, formed by bending out the lower slotted end of a strap-suspending plate, is still preserved. The front pantaloon-strap, L, passes through the upwardly-converging side slots, and also under the loop of one of said strap-plates D, and is crossed upon the outer side of the plate in the same way as the back strap.

It will be seen that the wedge-shaped binding-plate can be readily loosened by holding the sleeve and either pressing up against the lower end of the binding-plate or drawing the web upwardly through the sleeve, and that after the binding-plate has been drawn or otherwise forced into the sleeve it will remain wedged therein until intentionally loosened. The flattened sleeve I is formed from a strip of metal bent into proper shape, so as to bring its ends together. The ends of this plate are firmly and effectively connected with each other by means of a connection which entirely obviates the employment of solder. In Figs. 7, 9, and 13 this connecting device consists of a metal plate or strip, M, having tapering ends M'. The plate is arranged to cross the joint in the sleeve, and its ends are passed through slots in the sleeve and then bent back against the inner side of the sleeve, so as to hold the plate firmly upon the sleeve.

In Figs. 8, 10, and 11 the fastening device employed at the joint in the sleeve consists of an eyelet, O. For this form of fastening segment-shaped portions are removed from the meeting ends of the plate forming the sleeve, so that the said ends shall embrace the body of the eyelet, which latter is clinched or upset, so as to secure it on both sides of the sleeve. The ends of the plate forming the sleeve might, however, be made to overlap and then be struck up, so as to practically form an eyelet at the joint.

From the foregoing it will be seen that the feature of the loop at either or both ends of the back attachment can be applied to an attachment made in one piece, as well as to an attachment composed of two pieces connected together by a snap-link.

In addition to the advantages hereinbefore described, it may be mentioned that the end edge of the back attachment provided with a loop of this character will not rub and wear the shirt and inconvenience the body of the wearer, as heretofore, since the double friction of the web at the back of the attachment will keep such edge from the body of the person wearing the suspender.

In conclusion, we will observe that while we have herein shown and described the back attachment made in one piece, and also the binding-plate, and means for connecting the binding-plate with the front strap, likewise made in one piece, no claim is made to such features in this application, the right being reserved to claim such features in another application for Letters Patent which we have made and filed in the United States Patent Office simultaneously with the present application.

Having thus described our invention, what we claim, and desire to secure by Letters Patent, is—

1. The combination, with a suspender, of a plate provided near one end with a slot, C², formed transversely to the line of connection between the said straps, and having its said end bent outwardly at the end of the slot and on a line parallel with the same, so as to convert the extreme end of the plate into a loop standing out from the plane of the plate, substantially as shown and described, and for the purpose set forth.

2. The combination, with a suspender, of the front attachment consisting of a sleeve fitted to slide on the shoulder-strap, and a binding-plate provided with side edges converging toward each other, adapted to slide and wedge in between the said sleeve and strap, and having front and rear bearing-faces converging to its lower end, in combination with the pantaloon-strap, and means, substantially as described, for connecting the same with the lower end of the wedge-shaped binding-plate, for the purpose set forth.

3. In a suspender, the combination, with the web and the sleeve arranged to slide upon the web, of the binding-plate provided at its lower end with an eye and a plate, substantially as described, connected with the strap and suspended by a snap-link from the binding-plate.

4. In a suspender, the front attachment for the front strap, consisting of a sleeve and a wedge-shaped binding-plate adapted to wedge in between the sleeve and the web, in combination with plate D, connected with the binding-plate, and having its lower end slotted transversely and bent outwardly to form a loop, substantially as described.

5. The combination, with the web and binding-plate from which a suspender-strap is suspended, of the sleeve fitted upon the web and formed of a metal plate bent into shape and having its meeting ends secured together by a fastening-plate, substantially as described.

ALVA M. FREEMAN.
JOHN B. OVERMEYER.

Witnesses:
W. W. ELLIOTT,
CHAS. G. PAGE.